(12) United States Patent
Uchida (10) Patent No.: US 6,947,298 B2
(45) Date of Patent: Sep. 20, 2005

(54) SWITCHING POWER SOURCE APPARATUS

(75) Inventor: Akihiro Uchida, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 10/505,795

(22) PCT Filed: Feb. 17, 2003

(86) PCT No.: PCT/JP03/01613

§ 371 (c)(1),
(2), (4) Date: Aug. 25, 2004

(87) PCT Pub. No.: WO03/071666

PCT Pub. Date: Aug. 28, 2003

(65) Prior Publication Data

US 2005/0036342 A1 Feb. 17, 2005

(30) Foreign Application Priority Data

Feb. 25, 2002 (JP) ........................................ 2002-048534

(51) Int. Cl.[7] ........................ H02M 3/335; H02M 7/122
(52) U.S. Cl. ................................ 363/21.17; 363/21.12; 363/56.01
(58) Field of Search ..................... 363/16, 20, 21.01, 363/21.12, 21.13, 21.17, 56.01–56.05, 97, 131; 361/18, 79, 86, 87, 91.1; 323/282, 283, 285–290

(56) References Cited

U.S. PATENT DOCUMENTS 5,621,623 A * 4/1997 Kuriyama et al. ............ 363/20
5,862,044 A * 1/1999 Shioya et al. ............ 363/21.07
6,088,244 A * 7/2000 Shioya et al. ............ 363/21.07
6,351,398 B1 * 2/2002 Balakrishnan et al. ... 363/56.03
6,487,059 B2 * 11/2002 Bontempo et al. ............ 361/90
6,674,271 B2 * 1/2004 Choo et al. .................. 323/282
2002/0011825 A1   1/2002 Usui

FOREIGN PATENT DOCUMENTS

| JP | 07-131984 | 5/1995 |
| JP | 10-66331 | 3/1998 |
| JP | 11-266580 | 9/1999 |
| JP | 2000-32743 | 1/2000 |

* cited by examiner

Primary Examiner—Matthew V. Nguyen
(74) Attorney, Agent, or Firm—Brenda O. Holmes; Kilpatrick Stockton LLP (57) ABSTRACT

A switching power source which enables a continuous operation of an apparatus even under an overvoltage test such as a ring wave test. In a case where the sensed voltage (Vb) of the secondary winding (5b) through a diode (D6), the Zener diode (ZD3), and a resistor (R21) to the non-inverting input terminal (+) of a comparator (31), and a high-level signal is inputted to a flip-flop (35) from the comparator (31). As a result, a high-level signal outputted from the Q output terminal is held and outputted to a flip-flop (15) as a reset signal via an OR circuit (37), so that a drive signal kept outputted from the Q output terminal of the flip-flop (15) switches to a low-level one to continue the off-control of the switching element (Q1).

3 Claims, 6 Drawing Sheets

(b) Q OUTPUT OF FF15

SWITCHING POWER SOURCE APPARATUS

TECHNICAL FIELD

The present invention relates to a switching power source apparatus having a power-factor improving function, and particularly, to a switching power source apparatus having an overvoltage protecting function.

BACKGROUND TECHNOLOGY

Figure 1:
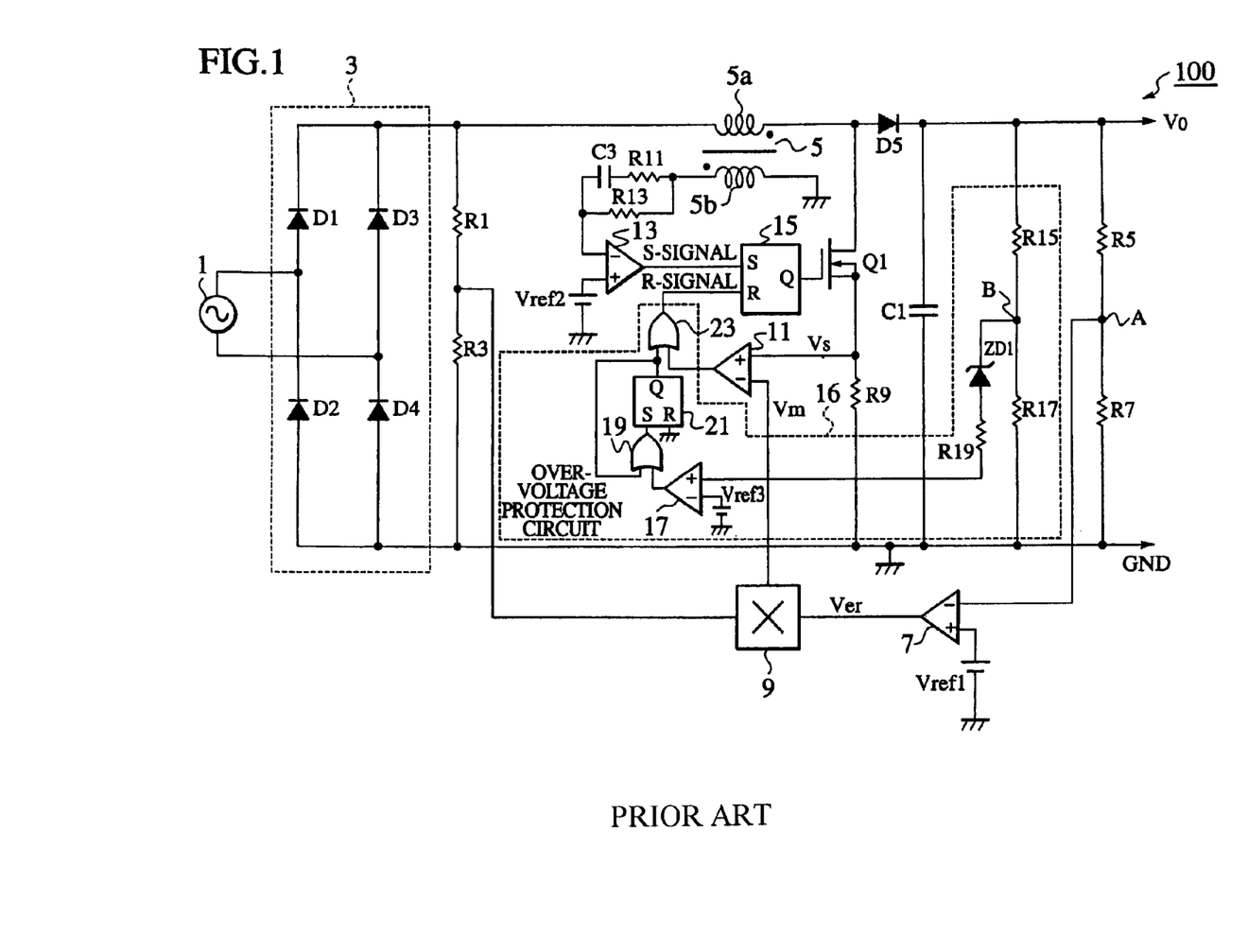
FIG. 1 is a view showing an arrangement of a conventional power-factor improving converter 100.

A known conventional switching power source apparatus is shown in FIG. 1. Operation of the conventional switching power source apparatus 100 as shown in FIG. 1 will be explained.

An AC power source 1 is applied to the power source apparatus, and a rectifier 3 full-wave-rectifies a sinusoidal voltage supplied from the AC power source 1 and supplies the full-wave-rectified waveform to this chopper circuit Initially, an end of a secondary coil 5b provided for a step-up reactor 5 is connected to GND, and the other end thereof is connected to a inverting (−) input terminal of a comparator 13 through a resistor R13. At the same time, a non-inverting (+) input terminal of the comparator 13 receives a reference voltage Vref2. The comparator 13 compares the input voltages with each other, and if the reference voltage Verf2 inputted to the non-inverting input terminal is greater than a detect voltage value of the secondary coil 5b inputted to the inverting input terminal, outputs a high-level set signal to a flip-flop 15.

The flip-flop 15 is set in response to the set signal from the comparator 13, and a Q output terminal outputs a high-level drive signal to turn on a switching element Q1. When the switching element Q1 is turned on, a switching current flows through a primary coil 5a of the step-up reactor 5, the drain-source of the switching element Q1, and a current detecting resistor R9 to GND, to thereby accumulate energy in the step-up reactor 5.

At this time, the switching current flowing through the switching element Q1 is converted into a voltage Vs by the current detecting resistor R9 being arranged between the source of the switching element Q1 and GND. The voltage Vs is inputted to a non-inverting (+) input terminal of a comparator 11, which compares it with a current target value Vm output from a multiplier 9.

When the voltage-converted value Vs of the switching current reaches the current target value Vm, the comparator 11 outputs a high-level reset signal through an OR circuit 23 to the flip-fop 15. The flip-flop 15 is reset in response to the reset signal being received from the comparator 11 through the OR circuit 23, to change the drive signal output from the Q output terminal from the high level to a low level to turn off the switching element Q1.

When the switching element Q1 is turned off, the energy accumulated in the step-up reactor 5 is combined with a voltage supplied from the rectifier 3, to charge an output capacitor C1 through a rectifying diode D5. As a result, the output capacitor C1 receives a DC voltage that has been stepped up higher than a peak value of the full-wave-rectified waveform supplied from the rectifier 3.

The voltage applied to the capacitor C1 is divided by resistors R5 and R7 and is inputted to an error amplifier 7, which compares it with a reference voltage Vref1 and supplies an error voltage Ver to the multiplier 9.

The full-wave-rectified waveform from the rectifier 3 is divided by resistors R1 and R3 and is inputted to the multiplier 9, which multiplies it by the error voltage and supplies the current target value Vm for a switching current to the inverting (−) input terminal of the comparator 11.

Next, when the discharge of the energy accumulated in the step-up reactor 5 ends, a voltage induced at the secondary coil 5b inverts. This voltage is compared with the reference voltage Vref2 in the comparator 13, which outputs a high-level set signal to the flip-flop 15. In response to the set signal from the comparator 13, the flip-flop 15 is set to again supply a drive signal to turn on the switching element Q1.

Thereafter, such operation is repeated to maintain an output voltage of the output capacitor C1 at a constant value. At the same time, a current of the AC power source 1 becomes a sinusoidal current waveform based on the voltage of the AC power source 1.

Next, basic operation of an overvoltage protection circuit 16 arranged in the conventional switching power source apparatus 100 will be explained.

In the overvoltage protection circuit 16, a voltage at a point B that divides the output voltage Vo by resistors R15 and R17 is input to a cathode of a Zener diode ZD1.

If the voltage at the point B is lower than a Zener voltage of the Zener diode ZD1, the Zener diode has a high impedance not to pass a current to a resistor R19, and therefore, a voltage at a non-inverting (+) input terminal of a comparator 17 is lower than a reference voltage Vref3. Accordingly, the comparator 17 provides a low-level output, and a Q output terminal of a flip-flop 21 provides a low-level output As a result, a high-level reset signal being periodically outputted from the comparator 11 is supplied to the flip-flop 15 through the OR circuit 23. Consequently, the output voltage of the output capacitor C1 is maintained at a constant level as mentioned above.

On the other hand, if the voltage at the point B is higher than the Zener voltage of the Zener diode ZD1, a current is passed to the resistor R19, and therefore, a voltage at the "+" input terminal of the comparator 17 becomes higher than the reference voltage Vref3. Then, the comparator 17 outputs a high-level signal to set the flip-flop 21. Then, the Q output terminal of the flip-flop 21 outputs a high-level signal. The high-level signal output from the Q output terminal of the flip-flop 21 is input through an OR circuit 19 to a set terminal S of the flip-flop 21, and therefore, the Q output terminal of the flip-flop 21 outputs a high-level reset signal through the OR circuit 23 to a reset terminal R of the flip-flop 15. The reset signal is held at the reset terminal R. As a result, the ON operation of the switching element Q1 stops, and the output voltage of the output capacitor C1 drops to 0 V and is kept at there.

Next, an input voltage varying test, a limit input voltage test, and a ring wave test conducted on the conventional switching power source apparatus 100 will be explained.

(1) Input Voltage Varying Test

The input voltage varying test supplies the AC power source 1 in the range of AC 90 V to AC 264 V, and in a case where the output voltage Vo is, for example, DC 380 V, it is determined that operation of the apparatus is normal.

(2) Limit Input Voltage Test

The limit input voltage test supplies the AC power source 1 of AC 400 V at the maximum, and in a case where the output voltage Vo is a DC voltage greater than, for example, an effective value of the input voltage, it is determined that operation of the apparatus is normal.

(3) Ring Wave Test

The ring wave test supplies an AC voltage (480√2V) formed by superimposing a pulse signal of 240√2V on an AC power source of, for example, AC 240 V, and in a case where the output voltage Vo is a DC voltage of, for example, 380 V, it is determined that operation of the apparatus is normal.

DISCLOSURE OF THE INVENTION

When overvoltage tests including the ring wave test are conducted on the conventional switching power source apparatus 100, the problem mentioned below will occur.

With reference to a timing chart shown in FIG. 2, a ring wave test with a highest voltage applied to the conventional switching power source apparatus 100 will be explained.

Figure 2:
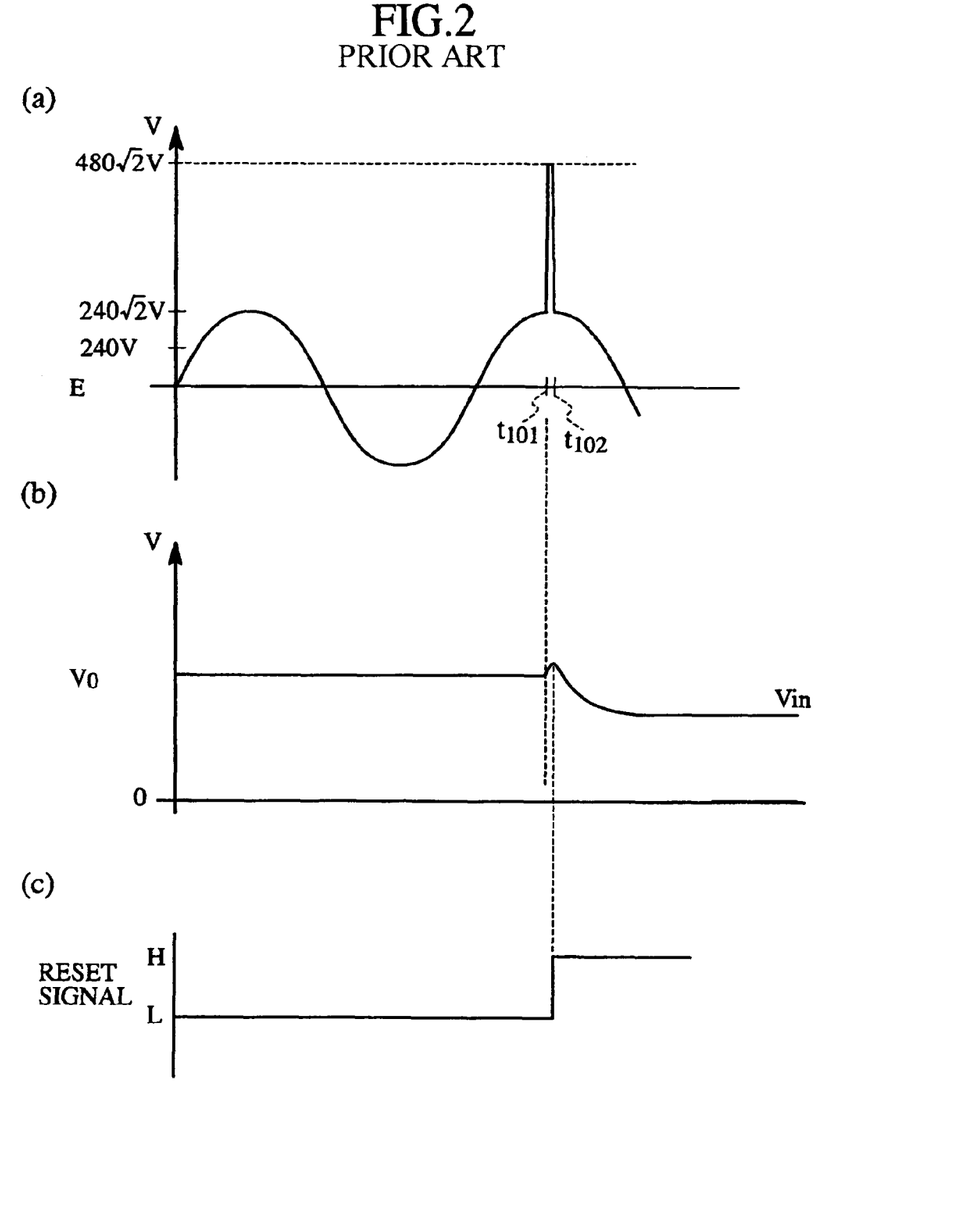
FIG. 2 is a timing chart explaining a voltage test operation of the conventional power-factor improving converter 100.

In FIG. 2(*a*), a pulse signal of 240√2 is superimposed on an AC power source of AC 240 V between timing t101 and t102 to provide a voltage (480√2V). In this case, a voltage at the point B of FIG. 1 becomes higher than the Zener voltage of the Zener diode ZD1, to pass a current to the resistor R19. As a result, a voltage at the non-inverting (+) input terminal of the comparator 17 becomes higher than the reference voltage Vref3. Accordingly, the comparator 17 outputs a high-level signal to set the flip-flop 21 so that the Q output terminal thereof provides a high-level output. Thereafter, the high-level output signal from the Q output terminal of the flip-flop 21 is input to the set terminal S of the flip-flop 21 through the OR circuit 19. As shown in FIG. 2(*c*), the Q output terminal of the flip-flop 21 provides a high-level reset signal to the reset terminal R of the flip-flop 15 through the OR circuit 23, and the reset signal is kept at the reset terminal R.

Consequently, the ON operation of the switching element Q1 stops, and as shown in FIG. 2(*b*), the output voltage Vo of the output capacitor C1 drops to the power source voltage. Even if the pulse signal applied to the AC power source between t101 and t102 is stopped, the overvoltage protection circuit 16 arranged in the conventional switching power source apparatus 100 continuously outputs the reset signal.

In this way, the conventional switching power source apparatus 100 has the problem of easily activating the overvoltage protection circuit 16 during an overvoltage test such as the ring wave test.

The present invention was made in consideration of the above-mentioned problem. An object of the present invention is to provide a switching power source capable of continuously operating an apparatus when an input voltage varying test, a limit input voltage test, a ring wave test, and the like are carried out.

According to a fist technical aspect of the present invention, there is provided a switching power source apparatus that supplies an AC voltage to a step-up reactor, ON/OFF-controls a switching element connected to an output of the step-up reactor to provide a stepped-up DC voltage hither than the AC voltage, and outputs the DC voltage. The apparatus includes ON control means for turning on the switching element when a voltage generated at a secondary coil of the step-up reactor becomes lower than a first reference voltage, error voltage generation means for generating an error voltage made from a difference between a detected value of the output voltage and a second reference voltage, current target value generation means for generating a current target value interlocked with a full-wave-rectified waveform of the AC voltage, from the full-wave-rectified waveform and error voltage, and OFF control means for turning off the switching element when a current passing through the switching element reaches the current target value. The apparatus has overvoltage protection means for continuously stopping the operation of the switching element only when an overvoltage greater than a third reference voltage is generated at the secondary coil of the step-up reactor.

According to a second technical aspect of the present invention, the third reference voltage set for the overvoltage protection means is defined to be greater than a voltage that is applied to the AC voltage in an overvoltage test such as a ring wave test.

According to a third technical aspect of the present invention, the overvoltage protection means continuously stops the operation of the switching element when the error voltage generated by the error voltage generation means is kept at a maximum value.

BEST MODE OF IMPLEMENTATION

Figure 3:
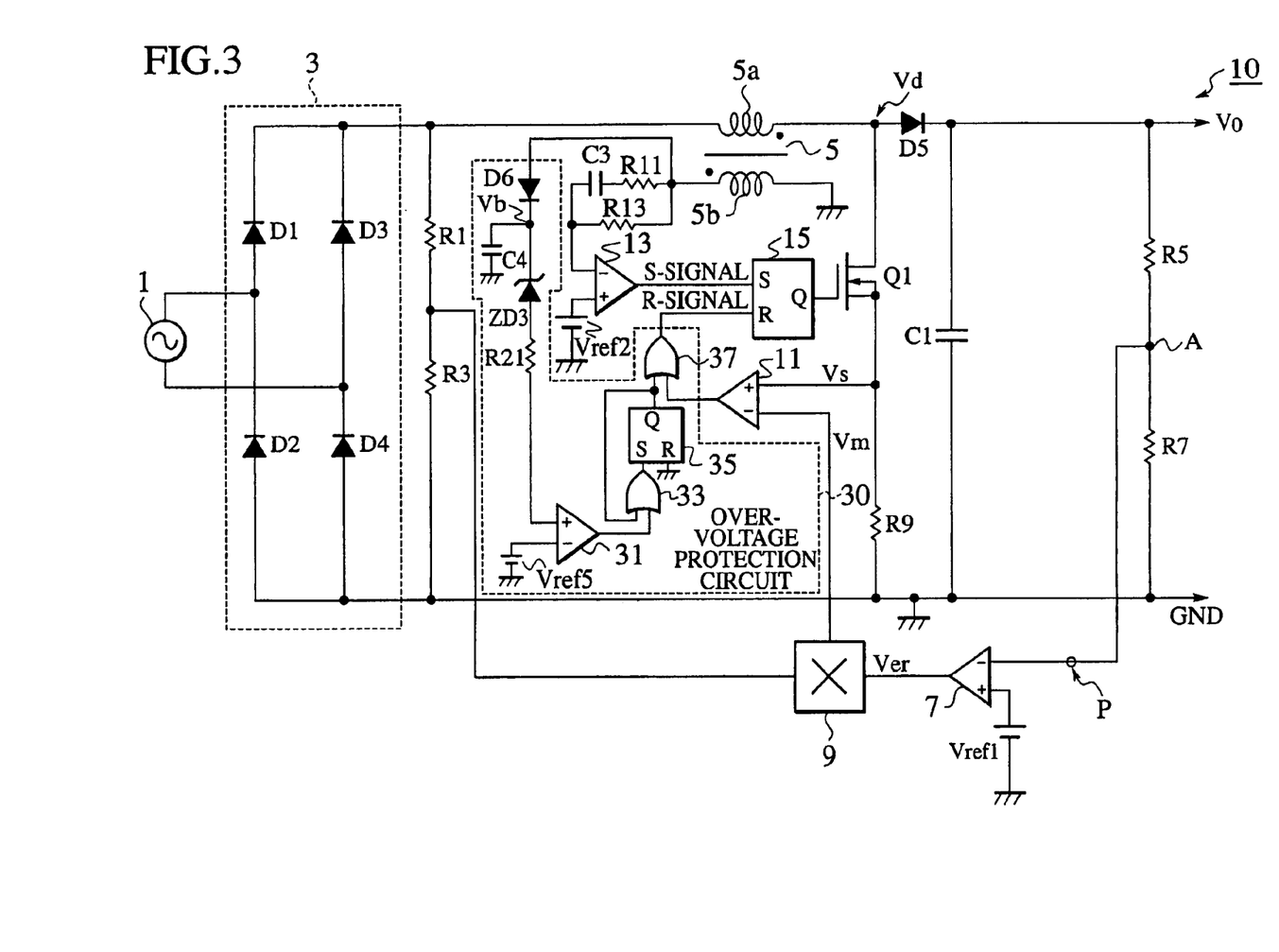
FIG. 3 is a view showing an arrangement of a power-factor improving converter 10 applicable to a switching power source apparatus according to an embodiment of the present invention.

Embodiments of the present invention will be explained with reference to the drawings. FIG. 3 is a view showing an arrangement of a power-factor improving converter 10 applicable to a switching power source apparatus according to an embodiment of the present invention. With reference to FIG. 3, the arrangement of the power-factor improving converter 10 will be explained.

In FIG. 3, an AC power source 1 supplies a sinusoidal voltage, which is full-wave-rectified by a rectifier 3 which includes diodes D1 to D4. The full-wave-rectified waveform is supplied to a chopper circuit.

A step-up reactor 5 has a primary coil 5*a* and a secondary coil 5*b*. An end of the primary coil 5*a* is connected to an output terminal of the rectifier 3 and a resistor R1. The other end of the primary coil 5*a* is connected to a drain of a switching element Q1 and an anode of a rectifying diode D5. A cathode of the rectifying diode D5 is connected to an end of an output capacitor C1.

An end of the secondary coil 5*b* is connected to GND, and the other end of the secondary coil 5*b* is connected to an inverting input terminal (−) of a comparator 13 through a resistor R13. The resistor R13 is connected in parallel with a resistor R11 and a capacitor C3 that are connected in series.

A structure of a control system of the power-factor improving converter 10 will be explained.

The inverting input terminal (−) of the comparator 13 is connected to GND through the above-mentioned resistor R13 and the like and the secondary coil 5*b*. A non-inverting input terminal (+) of the comparator 13 receives a reference voltage Vref2. The comparator 13 compares the input voltages with each other, and if the voltage generated at the secondary coil 5b and input to the inverting input terminal is lower than the reference voltage Vref2, outputs a high-level set signal to a set terminal of a flip-flop 15.

The set input terminal of the flip-flop 15 is connected to an output terminal of the comparator 13, a reset input terminal thereof is connected through an OR circuit 37 to an output terminal of a comparator 11, and a Q output thereof is connected to a gate terminal of the switching element Q1. Upon receiving a high-level set signal from the comparator 13, the flip-flop 15 outputs a high-level drive signal from the Q output terminal. Upon receiving a high-level reset signal through the OR circuit 37 from the comparator 11, the flip-flop 15 provides a low-level output from the Q output terminal.

An inverting input terminal (−) of an error amplifier 7 receives an output voltage divided by resistors R5 and R7, and a non-inverting input terminal (+) thereof receives a reference voltage Vref1. The error amplifier 7 generates an error voltage made from a difference between the output voltage Vo and the reference voltage Vref1 and supplies it to a multiplier 9. An input terminal of the multiplier 9 receives a voltage formed by dividing the full-wave-rectified waveform from the rectifier 3 by resistors R1 and R3, and the other input terminal thereof receives the error voltage from the error amplifier 7. The multiplier 9 multiplies the full-wave-rectified waveform by the error voltage and supplies a current target value Vm interlocked with the full-wave-rectified waveform to an inverting input terminal (−) of the comparator 11.

The inverting input terminal of the comparator 11 receives the current target value Vm for a switching current from the multiplier 9, and the non-inverting input terminal thereof receives a detected current value that corresponds to a drain-source current during an ON period of the switching element Q1 and is detected by a current detecting resistor R9. When the switching current reaches the current target value Vm interlocked with the full-wave-rectified waveform, the comparator 11 outputs a high-level reset signal through the OR circuit 37 to the flip-flop 15.

Next, a structure of an overvoltage protection circuit 30 arranged in the power-factor improving converter 10 will be explained.

An anode of a diode D6 is connected to the other end of the secondary coil 5b serving as an overvoltage detecting point, and a cathode of the diode D6 is connected to a capacitor C4 and a cathode of a Zener diode ZD3. The other end of the capacitor C4 is connected to GND. The other end of the secondary coil 5b is also connected to the resistors R11 and R13 of the control system of the power-factor improving converter 10.

An anode of the Zener diode ZD3 is connected through a resistor R21 to a non-inverting input terminal (+) of a comparator 31. A inverting input terminal (−) of the comparator 31 receives a reference voltage Vref5. The comparator 31 compares the input voltages with each other, and if the voltage input to the non-inverting input terminal is higher than the reference voltage Vref5, outputs a high-level overvoltage signal through an OR circuit 33 to a set terminal of a flip-flop 35.

The flip-flop 35 provides a Q output through the OR circuit 37 to the reset terminal R of the flip-flop 15. Namely, the set terminal S of the flip-flop 35 is connected to the output terminal of the OR circuit 33, and in a case where the set terminal receives a high-level input, the Q output terminal of the flip-flop 35 is latched at a high level which is supplied to the OR circuit 37. Further, the high-level signal of the Q output terminal is supplied through the OR circuit 33 to the set terminal S of the flip-flop 35, and therefore, the Q output terminal is locked at the high level.

If any one of the two input terminals of the OR circuit 37 receives a high-level signal, a high-level reset signal is input to the reset terminal of the flip-flop 15 to reset the flip-flop 15. Then, the Q output terminal thereof is kept at a low level to turn off the switching element Q1. Accordingly, if an overvoltage is detected at the other end of the secondary coil 5b, the Q output of the flip-flop 35 is locked at a high level to forcibly reset the flip-flop 15 through the OR circuit 37.

In this way, the switching power source apparatus 10 is characterized by the switching control means for turning on and off the switching element according to a voltage Vb produced at the secondary coil 5b of the step-up reactor 5 and a current passing through the switching element Q1 and by the overvoltage protection means 30 for stopping the operation of the switching element only when a voltage produced at the secondary coil 5b is greater than the reference voltage Vref5 and maintaining the stoppage of the switching element.

Operation of the switching power source apparatus according to the embodiment of the present invention will be explained.

The AC power source 1 is applied to the power source apparatus, and the rectifier 3 full-wave-rectifies the sinusoidal voltage supplied from the AC power source 1 and supplies the rectified voltage to the chopper circuit (1) Starting Operation Initially, the inverting input terminal of the comparator 13 is connected through the resistor R13 and secondary coil 5b to GND. At the same time, the non-inverting input terminal of the comparator 13 receives the reference voltage Vref2. The comparator 13 compares the input voltages with each other. Since the voltage to the inverting input terminal is lower, the comparator 13 outputs a high-level set signal to the flip-flop 15.

Figure 4:
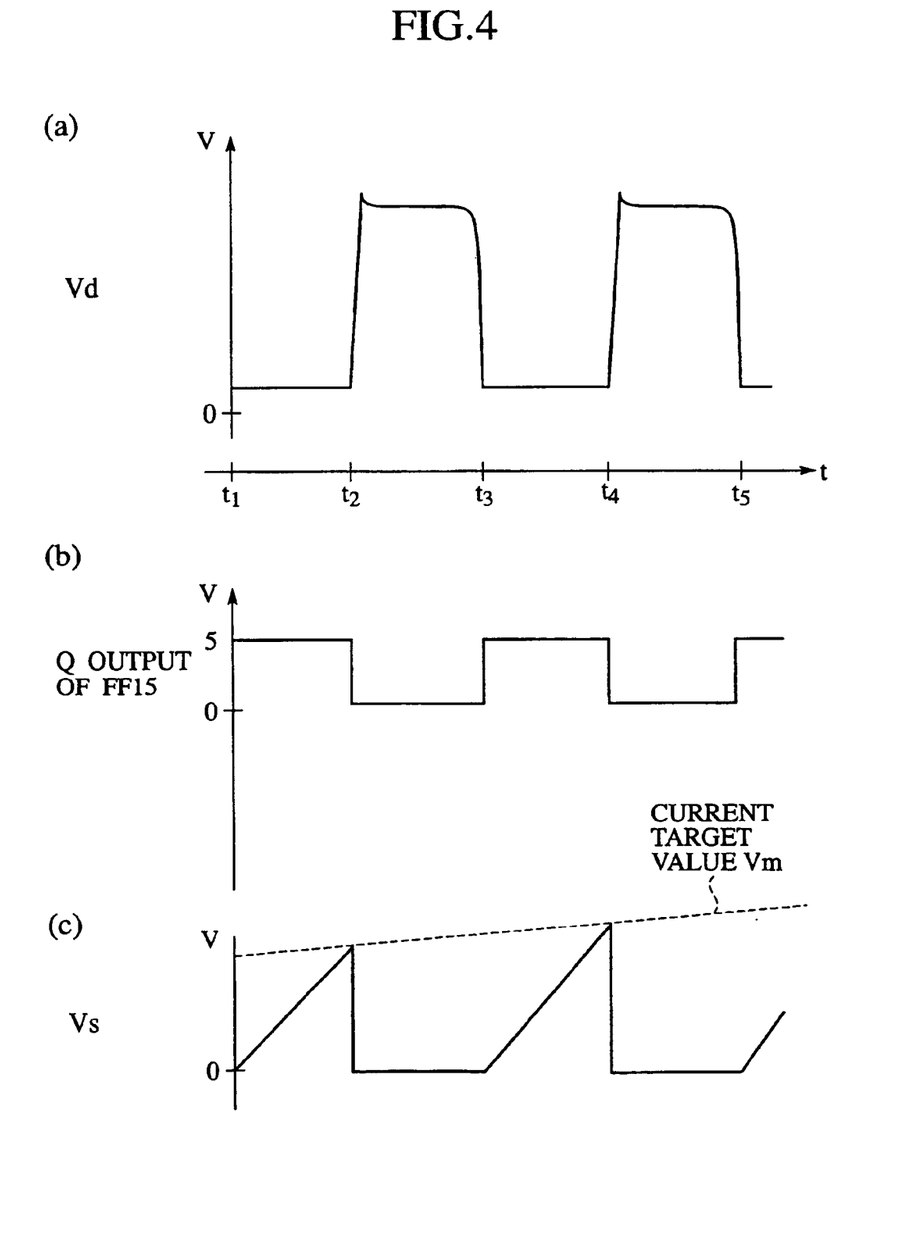
FIG. 4 shows timing charts explaining operation of the power-factor improving converter 10.

In response to the set signal from the comparator 13, the flip-flop 15 is set at timing t1 shown in FIG. 4(b) to output a high-level drive signal from the Q output terminal to turn on the switching element Q1.

When the switching element Q1 is turned on, a drain voltage Vd of the switching element Q1 drops close to 0 V at timing t1 as shown in FIG. 4(a). A switching current flows from the rectifier 3 through the primary coil 5a, the drain-source of the switching element Q1, and the current detecting resistor R9 to GND, thereby accumulating energy in the step-up reactor 5.

At this time, the switching current flowing to the switching element Q1 is converted into a voltage Vs as shown in FIG. 4(c) by the current detecting resistor R9 arranged between the source of the switching element Q1 and GND. The voltage Vs is input to the non-inverting input terminal of the comparator 11, which compares it with a current target value Vm that is interlocked with a full-wave-rectified waveform and is output from the multiplier 9.

(2) Current Target Value Vm

A stepped-up voltage induced at the primary coil 5a is superimposed with a pulse voltage full-wave-rectified by the rectifier 3, to provide an AC voltage. This AC voltage is rectified by the diode D5, is smoothed by the capacitor C1, and is output as an output voltage Vo from an output terminal. At the same time, the output voltage Vo being outputted from the output terminal is divided by the resistors R5 and R7 to output a DC voltage to the inverting input terminal of the error amplifier 7.

The error amplifier 7 generates an error voltage based on a difference between the DC voltage and the reference voltage Vref1 and supplies the error voltage to the multiplier 9. A waveform A shown in FIG. 5 indicates the error voltage output from the error amplifier 7.

At the same time, the full-wave-rectified waveform output from the rectifier 3 is divided by the resistors R1 and R3 and is supplied to the multiplier 9. A waveform B shown in FIG. 5 indicates the full-wave-rectified waveform output from the rectifier 3 whose frequency is twice as high as the frequency of a commercial power source.

Figure 5:
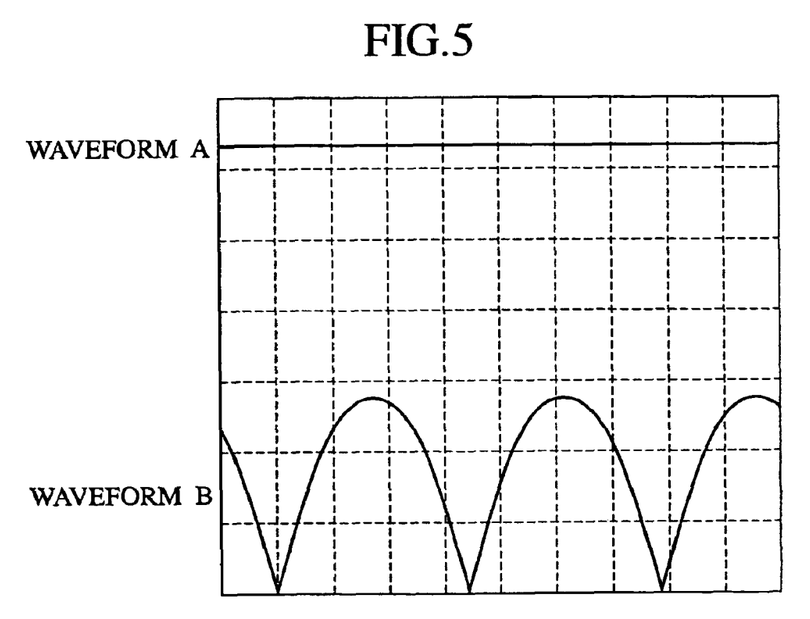
FIG. 5 shows waveforms A and B explaining operation of the power-factor improving converter 10.

The multiplier 9 generates a voltage by multiplying the full-wave-rectified waveform from the rectifier 3 by the error voltage from the error amplifier 7 and supplies a current target value Vm interlocked with the full-wave-rectified waveform to the inverting input terminal of the comparator 11.

(3) OFF Control of Switching Element

At timing t2 in FIG. 4(c), a detected current value Vs of a switching current reaches the current target value Vm interlocked with the full-wave-rectified waveform, and the comparator 11 outputs a high-level reset signal through the OR circuit 37 to the flip-flop 15. In response to the reset signal from the OR circuit 37, the flip-flop 15 is reset to switch the high-level drive signal output from the Q output terminal to a low level to turn off the switching element Q1.

When the switching element Q1 turns off, the energy accumulated in the step-up reactor 5 and the voltage supplied from the rectifier 3 are combined together to charge the output capacitor C1 through the rectifying diode D5.

As a result, the output capacitor C1 receives an output voltage Vo that has been stepped-up higher than a peak value of the full-wave-rectified waveform supplied from the rectifier 3 by a step-up quantity produced by the reactor 5.

(4) ON Control of Switching Element

When the discharge of the energy accumulated in the step-up reactor 5 ends, the voltage of the secondary coil 5b inverts. When this voltage becomes substantially 0 V and is surpassed by the reference voltage Vref2, the comparator 13 at timing t3 outputs a high-level set signal to the flip-flop 15.

In response to the set signal from the comparator 13, the flip-flop 15 is set to again provide a drive signal to turn on the switching element Q1 at timing t3 shown in FIG. 4(b).

Thereafter, such operation is repeated to maintain a constant voltage to be output from the output capacitor C1 of the power-factor improving converter 10. At the same time, a current from the AC power source 1 becomes a sinusoidal current waveform to follow a voltage of the AC power source 1.

(5) Operation of Overvoltage Protection Circuit in Normal Time

In the overvoltage protection circuit 30, a voltage generated at the secondary coil 5b of the step-up reactor 5 is rectified and smoothed by the diode D6 and capacitor C4, to generate a harmonic-noise erased detected voltage Vb.

Figure 6:
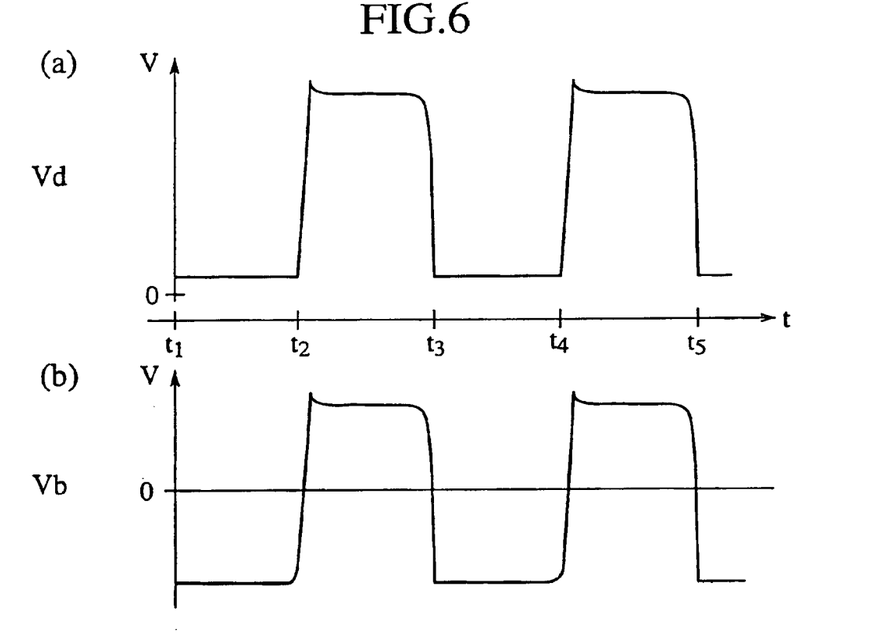
FIG. 6 shows timing charts of normal operating voltage of a step-up reactor 5 arranged in the power-factor improving converter 10.

While the switching element Q1 is controlled to OFF during from the timing t2 to the timing t3 as shown in FIG. 6, the secondary coil 5b of the step-up reactor 5 generates a voltage based on a voltage between terminals of the primary coil 5a with the switching element Q1 being OFF and a winding ratio between the primary coil 5a and the secondary coil 5b. In a case where the switching element Q1 is controlled to OFF, the output of the primary coil on the anode side of the diode D5 is higher than the output voltage of the rectifier 3 and is equal to a difference voltage (step-up quantity) between the output voltage Vo and the output voltage of the rectifier 3. Accordingly, the output of the secondary coil 5b on the anode side of the diode D6 becomes higher than a GND level. As a result, a detected voltage Vb generated on the cathode side of the diode D6 becomes positive as shown in FIG. 6(b).

On the other hand, while the switching element Q1 is controlled to be ON during from timing t3 to timing t4 as shown in FIG. 6, the secondary coil 5b of the step-up reactor 5 generates a voltage based on a voltage between terminals of the primary coil 5a with the switching element Q1 being ON and the winding ratio between the primary coil 5a and the secondary coil 5b. In a case where the switching element Q1 is controlled to ON, the primary coil receives a positive output voltage from the rectifier 3, and therefore, the output of the secondary coil 5b on the anode side of the diode D6 becomes lower than a GND level. As a result, a detected voltage Vb generated at the anode of the diode D6 becomes negative as shown in FIG. 6(b).

Namely, a terminal voltage of the secondary coil 5b is a positive voltage proportional to a step-up quantity when the switching element Q1 is OFF, and when it is ON, is a negative value proportional to an input voltage. As a result, the overvoltage protection circuit 30 using the diode 60 detects a positive voltage proportional to a step-up quantity.

Here, the voltage Vb detected in normal time does not exceed the Zener voltage Vz of the Zener diode ZD3 in a case where the switching element Q1 is controlled to ON or OFF, and therefore, no Zener current flows. Accordingly, a voltage applied to the non-inverting input terminal (+) of the comparator 31 is lower than the reference voltage Vref5.

As a result, the comparator 31 provides a low-level output, which is supplied through the OR circuit 33 to the set terminal S of the flip-flop 35, and therefore, the overvoltage protection circuit 30 is inoperative. Accordingly, the Q output terminal of the flip-flop 35 outputs a low-level signal, and the above-mentioned ON/OFF operation of the switching element is periodically repeated.

(6) Operation of Overvoltage Protection Circuit in Ring Wave Test

During from timing t101 to timing t102 as shown in FIG. 2, a pulse signal of 240√2V is superimposed on an AC power source of AC 240V, to provide a voltage (480√2V). Operation of the overvoltage protection circuit 30 at this time will be explained for ON period and OFF period.

Figure 7:
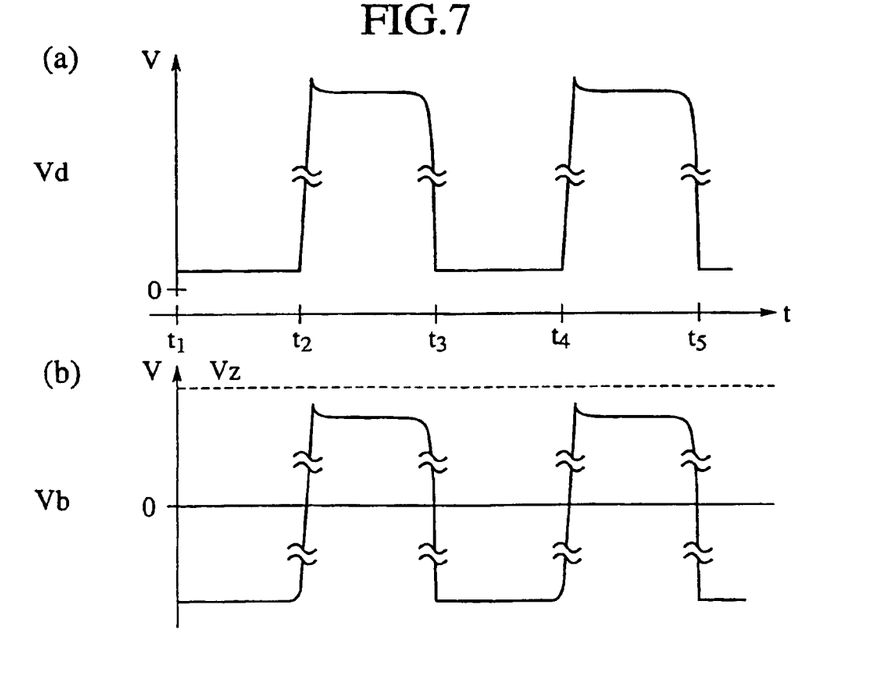
FIG. 7 shows timing charts of operating voltage during a voltage test of the step-up reactor 5 arranged in the power-factor improving converter 10.

While the switching element Q1 is controlled to OFF during from timing t2 to timing t3 as shown in FIG. 7, the secondary coil 5b of the step-up reactor 5 generates a voltage based on a terminal voltage of the primary coil 5a with the switching element Q1 being OFF and the winding ratio between the primary coil 5a and the secondary coil 5b. At the timing when the switching element Q1 is controlled to OFF, the output of the primary coil on the anode side of the diode D5 is higher than the output voltage of the rectifier 3 and is equal to a difference voltage (step-up quantity) between the output voltage Vo and the output voltage of the rectifier 3. Accordingly, the output of the secondary coil 5b on the anode side of the diode D6 becomes higher than a GND level. As a result, a detected voltage Vb generated on the anode side of the diode D6 becomes positive as shown in FIG. 7(b).

If the above-mentioned ring wave test is carried out at this moment, the output voltage of the rectifier 3 rapidly increases. The difference voltage (step-up quantity) between the output voltage Vo and the output voltage of the rectifier 3 becomes smaller, or the output voltage of the rectifier 3 becomes higher than the output voltage Vo. The voltage of the secondary coil 5b on the anode side of the diode D6, therefore, becomes smaller or becomes lower than the GND level. As a result, a detected voltage Vb generated on the anode side of the diode D6 becomes lower than the voltage shown in FIG. 6(b). Due to this, the overvoltage protection circuit is inoperative.

On the other hand, while the switching element Q1 is controlled to ON during from timing t3 to timing t4 as shown in FIG. 7, the secondary coil 5b of the step-up reactor 5 generates a voltage based on a terminal voltage of the primary coil 5a with the switching element Q1 being ON and the winding ratio between the primary coil 5a and the secondary coil 5b. At the timing when the switching element Q1 is controlled to ON, the primary coil receives a positive output voltage from the rectifier 3, and therefore, the output of the secondary coil 5b on the anode side of the diode D6 becomes lower than a GND level. As a result, a detected voltage Vb generated at the anode of the diode D6 becomes negative as shown in FIG. 7(b).

If the above-mentioned ring wave test is carried out at this moment, the output voltage of the rectifier 3 rapidly increases, and a terminal voltage of the secondary coil 5b becomes a negative voltage proportional to an input voltage. The overvoltage protection circuit 30 employs the diode 60 to detect a positive voltage proportional to a step-up quantity, and therefore, is inoperative in response to the increased negative voltage.

Namely, in the ring wave test, a maximum voltage (480√2V) is applied to the primary coil 5a of the step-up reactor 5, and the secondary coil 5b generates a ring wave voltage Vbmax based on the winding ratio between the primary coil 5a and the secondary coil 5b. If the Zener voltage Vz of the Zener diode ZD3 is set to be Vbmax<Vz, the overvoltage protection circuit 30 will be inoperative even if the above-mentioned input voltage varying test and limit input voltage test are carried out.

Accordingly, a voltage applied to the non-inverting input terminal (+) of the comparator 31 is lower than the reference voltage Vref5. As a result, the comparator 31 outputs a low-level signal, which is supplied through the OR circuit 33 to the set input terminal S of the flip-flop 35. The overvoltage protection circuit 30, therefore, is inoperative. The Q output terminal of the flip-flop 35 outputs a low-level signal, and therefore, the above-mentioned (3) ON/OFF control of switching element is periodically repeated.

(7) Operation of Overvoltage Protection Circuit on Disconnection at Point P

In normal state, the output voltage Vo from the output terminal is divided by the resistors R5 and R7 and is supplied as a step-up quantity to the inverting input terminal (−) of the error amplifier 7.

If wiring connecting a node A between the resistors R5 and R7 and the inverting input terminal (−) of the error amplifier 7 is broken at a point P, an input voltage to the inverting input terminal (−) becomes nearly 0 V, and a maximum error voltage is produced and supplied to the multiplier 9.

The multiplier 9 multiplies a full-wave-rectified waveform from the rectifier 3 by the maximum error voltage from the error amplifier 7 and supplies a maximum current target value Vm interlocked with the full-wave-rectified waveform to the inverting input terminal (−) of the comparator 11.

In the comparator 11, a detected current value Vs of a switching current continuously increases up to the maximum current target value Vm interlocked with the full-wave-rectified waveform, and therefore, an ON period of the switching element Q1 suddenly extended longer than that for the normal time. When a detected current value Vs reaches the maximum current target value Vm, the comparator 11 outputs a high-level reset signal through the OR circuit 37 to the flip-flop 15. In response to the reset signal from the OR circuit 37, the flip-flop 15 is reset to change a high-level drive signal output from the Q output terminal to a low-level signal to turn off the switching element Q1.

When the switching element Q1 turns off, energy accumulated in the step-up reactor 5 during the suddenly extended ON period is combined with a voltage supplied from the rectifier 3, to charge the output capacitor C1 through the rectifying diode D5.

At the same time, the secondary coil 5b of the step-up reactor 5 generates a maximum voltage based on the winding ratio between the primary coil 5a and the secondary coil 5b. A detected voltage Vb generated on the cathode side of the diode D6, a ring wave voltage Vbmax, and the Zener voltage Vz of the Zener diode ZD3 have a relationship of Vbmax<Vz<Vb. Since the detected voltage Vb exceeds the Zener voltage Vz of the Zener diode ZD3, a Zener current suddenly flows from the secondary coil 5b through the diode D6, the Zener diode ZD3, and the resistor R21 to the non-inverting input terminal (+) of the comparator 31. Due to this, the voltage applied to the non-inverting input terminal (+) of the comparator 31 becomes higher than the reference voltage Vref5.

As a result, the comparator 31 outputs a high-level signal, which is supplied through the OR circuit 33 to the set terminal S of the flip-flop 35 to activate the overvoltage protection circuit 30. Namely, the Q output terminal of the flip-flop 35 outputs a high-level signal, which is supplied as a reset signal through the OR circuit 37 to the reset terminal R of the flip-flop 15, to change a high-level drive signal output from the Q output terminal to a low-level signal to turn off the switching element Q1.

The Q output terminal of the flip-flop 35 provides an output signal latched at a high level again to the set terminal of the flip-flop 35 through the OR circuit 33, so that the output of the flip-flop 35 is locked at the high level. As a result, an always-high-level reset signal is outputted through the OR circuit 37 to the reset terms R of the flip-flop 15.

Consequently, the ON operation of the switching element Q1 is kept suspended, and the output voltage Vo of the output capacitor C1 drops to a power source voltage.

In this way, the present invention provides the switching power source apparatus 10 that supplies a pulse voltage to the step-up reactor 5 to turn on/off the switching element Q1 connected to the output of the step-up reactor 5, outputs a stepped-up DC voltage higher than an AC voltage, and supplies the output voltage. The overvoltage protection circuit 30 detects a voltage generated at the secondary coil 5b of the step-up reactor 5 during an OFF period of the switching element, and if the detected voltage is greater than a predetermined voltage, forcibly stops the operation of the switching element Q1. Namely, the overvoltage protection circuit 30 detects a voltage generated at the secondary coil 5b during an OFF period of the switching element, and therefore, can correctly detect only an overvoltage caused by an increase in a step-up quantity.

As a result, an overvoltage input due to, for example, a ring wave test gives no influence, and therefore, such an overvoltage input test will not cause an erroneous operation such as the stoppage of a power source.

When an error voltage generated by the error amplifier 7 is kept at a maximum value, the overvoltage protection circuit 30 operates to continuously suspend the operation of the switching element Q1, and therefore, can prevent the switching power source apparatus from outputting an overvoltage.

According to the present invention, there is provided a switching power source apparatus that supplies an AC voltage to a step-up reactor, ON/OFF-controls a switching element connected to an output of the step-up reactor to provide a stepped-up DC voltage hither than the AC voltage, and outputs the DC voltage. An overvoltage protection circuit thereof can be constituted to continuously stop the operation of the switching element when an AC voltage is produced to input an overvoltage greater than a third reference voltage to a secondary coil of the step-up reactor. For an AC voltage lower than the third reference voltage, the apparatus can continuously be operated.

By defining the third reference voltage to a voltage greater than an AC voltage applied in an overvoltage test such as a ring wave test, the apparatus can continuously be operative during the test.

What is claimed is:

1. A switching power source apparatus (10) that supplies an AC voltage to a step-up reactor (5), ON/OFF-controls a switching element (Q1) connected to an output of the step-up reactor to provide a stepped-up DC voltage hither than the AC voltage, and outputs the DC voltage, comprising:

ON control means for turning on the switching element in a case where a voltage generated at a secondary coil of the step-up reactor becomes lower than a fist reference voltage;

error voltage generation means for generating an error voltage made from a difference between a detected value of the output voltage and a second reference voltage;

current target value generation means for generating a current target value interlocked with a full-wave-rectified waveform of the AC voltage according to the full-wave-rectified waveform and the error voltage; and OFF control means for turning off the switching element when a current passing through the switching element reaches the current target value, the apparatus characterized by:

overvoltage protection means for continuously stopping the operation of the switching element only when an overvoltage greater than a third reference voltage is generated at the secondary coil of the step-up reactor.

2. The switching power source apparatus of claim 1, wherein the third reference voltage set for the overvoltage protection means is defined to be greater than a voltage that is applied to the AC voltage in an overvoltage test.

3. The switching power source apparatus of claim 1, wherein the overvoltage protection means continuously suspends the operation of the switching element in a case where the error voltage generated by the error voltage generation means is kept at a maximum value.

* * * * *